United States Patent
Lee et al.

(10) Patent No.: US 7,440,153 B2
(45) Date of Patent: Oct. 21, 2008

(54) BACKLIGHT UNIT FOR FLAT PANEL DISPLAY AND FLAT PANEL DISPLAY APPARATUS HAVING THE SAME

(75) Inventors: Su-mi Lee, Hwaseong-si (KR);
 Jin-Seung Choi, Suwon-si (KR);
 Jee-hong Min, Yongin-si (KR);
 Jin-hwan Kim, Suwon-si (KR);
 Yoon-sun Choi, Incheon-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 278 days.

(21) Appl. No.: 11/392,544

(22) Filed: Mar. 30, 2006

(65) Prior Publication Data
 US 2006/0279296 A1    Dec. 14, 2006

(30) Foreign Application Priority Data
 Jun. 11, 2005   (KR) .................... 10-2005-0050144

(51) Int. Cl.
 *G02B 5/32* (2006.01)
 *G02B 5/02* (2006.01)
 *F21V 7/04* (2006.01)

(52) U.S. Cl. .................... 359/15; 359/34; 359/569; 359/599; 362/617

(58) Field of Classification Search ............... 359/15, 359/34, 569, 566, 599; 362/617
 See application file for complete search history.

(56) References Cited

U.S. PATENT DOCUMENTS

| | | | | |
|---|---|---|---|---|
| 2,432,484 A | * | 12/1947 | Moulton | 359/580 |
| 6,196,691 B1 | * | 3/2001 | Ochiai | 362/617 |
| 6,798,574 B2 | * | 9/2004 | Kim | 359/566 |

FOREIGN PATENT DOCUMENTS

| | | |
|---|---|---|
| JP | 2004-234932 A | 8/2004 |
| KR | 10-2003-0004021 A | 1/2003 |
| KR | 10-2005-0045187 A | 5/2005 |

* cited by examiner

*Primary Examiner*—Audrey Y Chang
(74) *Attorney, Agent, or Firm*—Sughrue Mion, PLLC

(57) ABSTRACT

A backlight unit for a flat panel display and a flat panel display apparatus having the same. The backlight unit for a flat panel display includes a light source emitting light, a light guide panel having an incident surface facing the light source and totally reflecting light incident through the incident surface toward the flat panel display, a holographic pattern that is formed at at least one of an exit surface of the light guide panel or the opposing surface with a predetermined grating period and diffracts light incident into the light guide panel and a dot pattern containing a plurality of particles dispersed on the holographic pattern at intervals shorter than the grating period and scattering incident light.

18 Claims, 8 Drawing Sheets

BACKLIGHT UNIT FOR FLAT PANEL DISPLAY AND FLAT PANEL DISPLAY APPARATUS HAVING THE SAME

CROSS-REFERENCE TO RELATED PATENT APPLICATION

This application claims priority from Korean Patent Application No. 10-2005-0050144, filed on Jun. 11, 2005, in the Korean Intellectual Property Office, the disclosure of which is incorporated herein in its entirety by reference.

BACKGROUND OF THE INVENTION

1. Field of the Invention

The present invention relates to a backlight unit for a flat panel display and a flat panel display apparatus having the same and, more particularly, to a backlight unit for a flat panel display designed to alleviate or remove color separation by a diffraction grating and a flat panel display apparatus having the same.

2. Description of the Related Art

Unlike self-emissive flat panel displays, non-emissive flat panel displays such as liquid crystal display (LCD) panels need external light to produce an image. Thus, a backlight unit is located behind a non-emissive flat panel display and illuminates light on the flat panel display such as an LCD panel in order to produce an image. The backlight unit for the flat panel display is used as a backlight unit for an LCD device or a surface light source system such as an illuminating sign.

Backlight units are classified into direct light type backlight units and edge light type backlight units according to the position of a light source. A point light source having an approximately point-shaped light-emitting portion or a linear light source having a linear light-emitting portion disposed along one direction may be used as a light source for an edge light type backlight unit. Representative examples of the linear light source and point light source are a cold cathode fluorescent lamp (CCFL) having two electrodes at opposite ends within a tube and a light emitting diode (LED) (or laser diode), respectively.

Korean Laid-open Patent Publication No. 2003-4021 discloses a backlight unit for a flat panel display using a planar hologram filed by an applicant of the present invention. FIG. 1 is a schematic cross-sectional view of the disclosed backlight unit. Referring to FIG. 1, the backlight unit includes a light source 51 disposed within a housing 55, a light guide panel (LGP) 20 guiding light emitted by the light source 51 by the use of total reflection, a reflective member 31 that is disposed below the LGP 20 and reflects upward light escaping from the LGP 20, and a transmissive diffusion sheet 11 that is disposed above the LGP 20 and widely diffuses light escaping upward from the LGP 20. The LGP 20 has a holographic pattern 21 repeated continuously with a grating period P at the bottom thereof. The light incident on the LGP 20 is totally internally reflected into the LGP 20 by top and bottom surfaces thereof and propagates along the LGP 20. Some of light injected onto the holographic pattern 21 is diffracted downward onto the reflective member 31 by the holographic pattern 21 and reflected back into the LGP 20. When a white light source is used, white light having multiple wavelengths is separated into single-color light beams having different exit angles θt according to their different wavelengths, e.g., red (R) green (G), and blue (B) light beams as it passes through the holographic pattern 21.

The color separation occurs due to the characteristics of the holographic pattern 21. That is, because the light incident on the holographic pattern 21 is diffracted at different angles depending on the wavelength of the incident light, the white light of mixed wavelengths is separated into its component colors at different exit angles θt according to wavelength.

$$\Theta_t = \sin^{-1}[m\lambda/p + n\theta_i] \quad (1)$$

where m is a diffraction order, λ is the wavelength of incident light, P is a grating period of a holographic pattern, $\theta_t$ and $\theta_i$ are respectively exit angle and incident angle of light with respect to the holographic pattern, and n is a refractive index of an LGP as medium characteristics of an LGP having the holographic pattern. As evident from Equation (1), since the angle of light exiting the holographic pattern varies with the wavelength of incident light, white light having incident angle $\theta_i$ is separated into component colors according to wavelength as it passes through the holographic pattern.

FIG. 2 shows profiles of distribution of exit angle $\theta_t$ with respect to incident angle $\theta_i$ for individual blue (b), green (g), and red (r) color light. Profiles b, g, and r show changes in exit angles $\theta_t$ of blue, green, and red light. As evident from FIG. 2, the exit angle $\theta_t$ increases proportionally to incident angle $\theta_i$ of individual RGB color light. For example, when white light enters the LGP 20 at about 60° as shown in FIG. 1, green light may exit the LGP 20 at angle of about 0° while blue and red light exit the LGP 20 obliquely at angles of −7° and +7° with respect to vertically exiting green light, respectively.

Different colors are sensed by human eyes according to the direction in which an image is observed due to color separation caused by single color light exiting at different angles. For example, when a display plane is observed from the front, green may be more strongly sensed than other colors. When the display plane is observed obliquely away from a vertical axis, red and blue are more strongly sensed. Thus, the color separation leads to degradation in image quality.

SUMMARY OF THE INVENTION

The present invention provides a backlight unit with a simple structure that can acquire surface light that exits perpendicularly to the surface of the backlight unit and which can eliminate separation of white light of multiple wavelengths into component colors and a flat panel display apparatus including the backlight unit.

According to an aspect of the present invention, there is provided a backlight unit for a flat panel display displaying a predetermined image, including: a light source emitting light; a light guide panel having an incident surface facing the light source and totally reflecting light incident through the incident surface toward the flat panel display; a holographic pattern that is formed at either or both an exit surface of the light guide panel and the opposing surface with a predetermined grating period and which diffracts light incident into the light guide panel; and a dot pattern containing a plurality of particles dispersed on the holographic pattern at intervals shorter than the grating period and scattering incident light.

The particles may be arranged at irregular intervals and the holographic pattern may be formed by continuously repeating sine wave or concave-convex wave gratings with the grating period.

The grating period of the holographic pattern may be 300 to 500 nm and the diameter of the particles constituting the dot pattern may be 30 to 300 nm.

The diameter of the particles constituting the dot pattern progressively may decrease toward the light source while the density of the particles in the dot pattern distributed per unit area may increase toward the light source. In this case, the diameter of dot pattern varies continuously or stepwise depending on the distance from the light source.

The backlight unit may further include a transmissive diffusion plate that is located in front of the exit surface of the light guide panel and transmits and diffuses light escaping from the light guide panel and a reflective member disposed at a surface opposite to the exit surface of the light guide panel and reflecting light escaping from the light guide panel toward a display direction.

Alternatively, the backlight unit may include: a light source emitting light; a light guide panel having an incident surface facing the light source and totally reflecting light incident through the incident surface toward the flat panel display; and a holographic pattern that is continuously repeated at either or both an exit surface of the light guide panel and an opposing surface with a predetermined grating period and which diffracts light incident into the light guide panel, wherein the holographic pattern is arranged along a sine wave with a cycle of rise and fall repeated at intervals longer than the grating period.

The sine wave may have a cycle of rise and fall repeated at irregular intervals and the interval for the sine wave may progressively decrease toward the light source. The interval for the sine wave may vary continuously or stepwise depending on the distance from the light source. The holographic pattern may be formed by continuously repeating sine wave or concave-convex wave gratings with the grating period of 300 to 500 nm. The backlight unit may further include a transmissive diffusion plate that is located in front of the exit surface of the light guide panel and transmits and diffuses light escaping from the light guide panel and a reflective member disposed at a surface opposite to the exit surface of the light guide panel and reflecting light escaping from the light guide panel toward a display direction.

According to another aspect of the present invention, there is provided a flat panel display apparatus for displaying a predetermined image, which includes a flat panel display and a backlight unit irradiating light on the flat panel display, wherein the backlight unit includes: a light source emitting light; a light guide panel having an incident surface facing the light source and totally reflecting light incident through the incident surface toward the flat panel display; a holographic pattern that is formed at either or both an exit surface of the light guide panel and the opposing surface with a predetermined grating period and diffracts light incident into the light guide panel; and a dot pattern containing a plurality of particles dispersed on the holographic pattern at intervals shorter than the grating period and scattering incident light.

Alternatively, the flat panel display apparatus may include the backlight unit having: a light source emitting light; a light guide panel having an incident surface facing the light source and totally reflecting light incident through the incident surface toward the flat panel display; and a holographic pattern that is continuously repeated at either or both an exit surface of the light guide panel and opposing surface with a predetermined grating period and diffracts light incident into the light guide panel, wherein the holographic pattern is arranged along a sine wave with a cycle of rise and fall repeated at intervals longer than the grating period.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF ILLUSTRATIVE, NON-LIMITING, EMBODIMENTS OF THE INVENTION

A backlight unit for a flat panel display and a flat panel display apparatus having the same according to exemplary embodiments of the present invention will now be described in detail with reference to the accompanying drawings. The described exemplary embodiments are intended to assist the understanding of the invention, and are not intended to limit the scope of the invention in any way.

Figure 3:
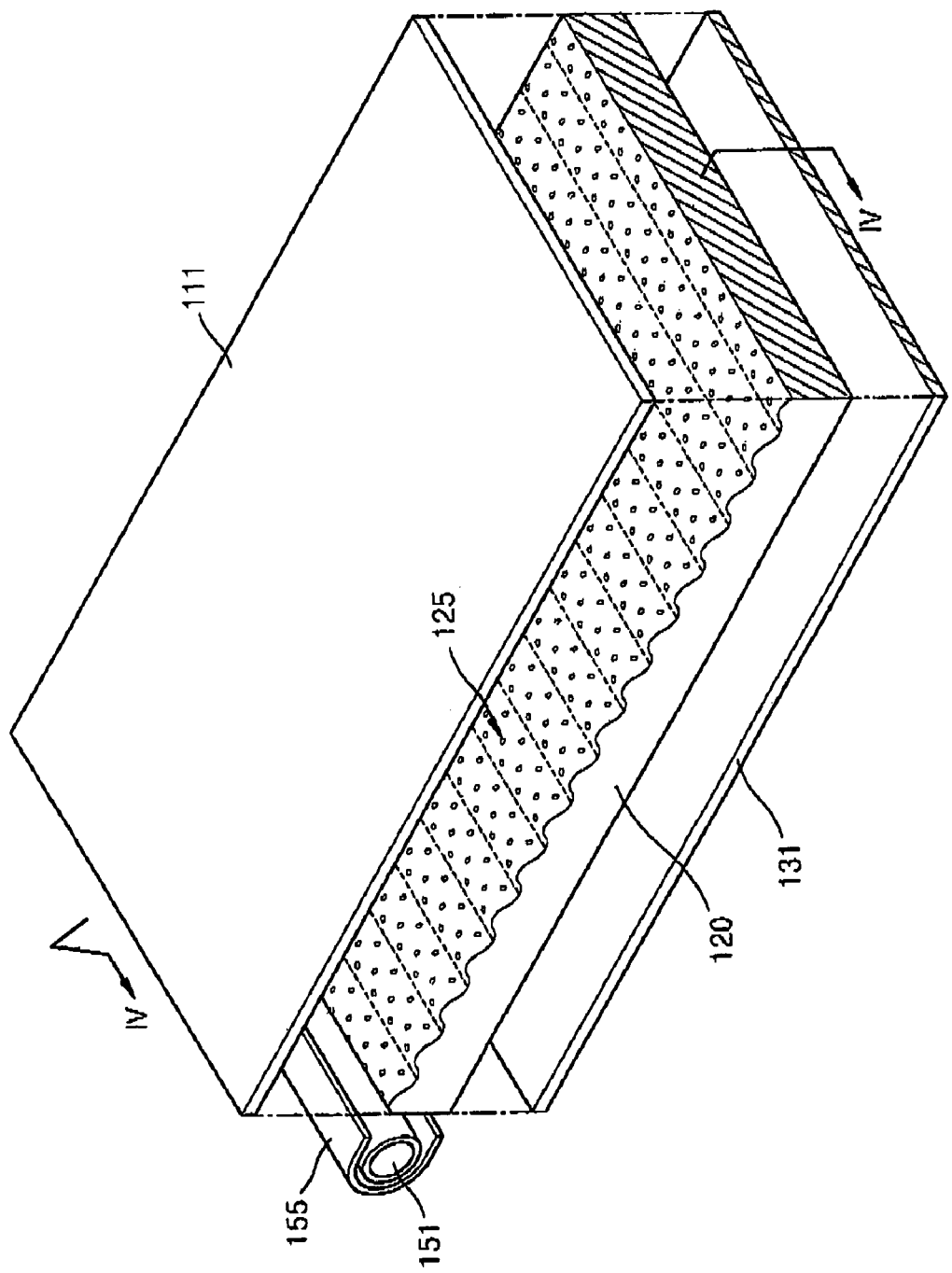
FIG. 3 is an exploded perspective view of a backlight unit for a flat panel display according to a first exemplary embodiment of the present invention.
Figure 4:
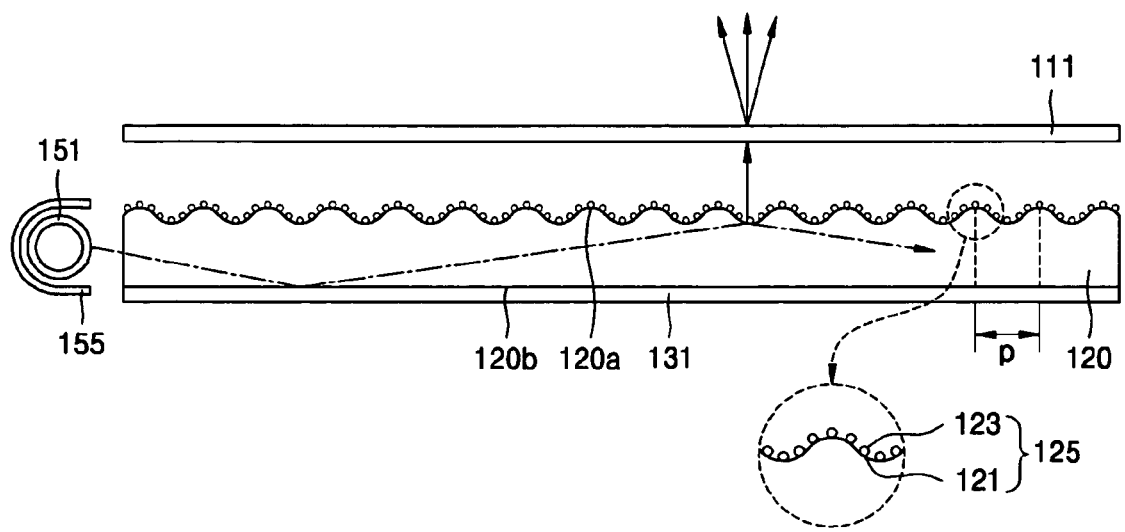
FIG. 4 is a cross-sectional view taken along line IV-IV of the backlight unit of FIG. 3.
Figure 5:
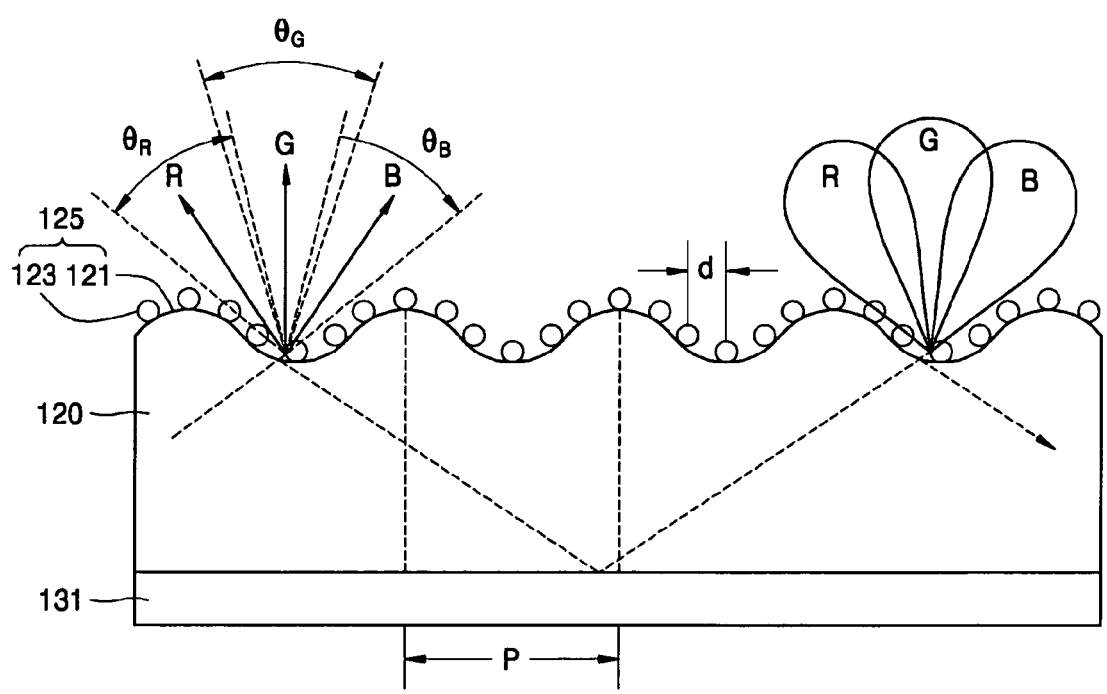
FIGS. 5 and 6 illustrate a distribution of light diffracted by the surface pattern layer shown in FIG. 4.

FIGS. 3 and 4 show an edge light type backlight unit as a backlight unit for a flat panel display according to a first exemplary embodiment of the present invention. Referring to FIG. 3, the backlight unit for a flat panel display includes a light source 151 producing and emitting light and a light guide panel (LGP) 120 totally internally reflecting light emitted by the light source 151 on one side so that the light can propagate to the other side. The LGP 120 has a surface pattern layer 125 diffracting light upward at a top surface thereof.

The light source 151 may be a white light source supplying white light of multiple wavelengths. In the present exemplary embodiment, the light source 151 may be a linear light source having a line-shaped light-emitting portion such as a Cold Cathode Fluorescent Lamp (CCFL). The light source 151 is installed within a light source housing 155 and some of the light beams emitted by the light source 151 are reflected by the housing 155 and guided into the LGP 120.

A light beam emitted by the light source 151 is incident into the LGP 120 via an incident surface that is a side surface of the LGP 120 and is totally internally reflected and propagates inside the LGP 120. The LGP 120 is made of a transparent material that can transmit the incident light beam. A commonly used material for the LGP 120 is a transparent acrylic-based resin having a refractive index of 1.49 and a specific gravity of about 1.19, such as polymethyl methacrylate (PMMA), or a transparent olefin-based resin with a specific gravity of 1.0 to achieve a light weight. The LGP 120 may have a thickness of about 0.6 to 3 mm.

Light incident into the LGP 120 is totally reflected by a bottom surface 120b and a top surface 120a opposite the bottom surface 120b of the LGP 120 and propagates in a zigzag pattern. The LGP 120 has the surface pattern layer 125 at either or both the top and bottom surfaces 120a and 120b. The surface pattern layer 125 diffracts incident light approximately perpendicular to a planar surface of the LGP 120. In the present exemplary embodiment, the surface pattern layer 125 is formed at the top surface of the LGP 120 and light diffracted by the surface pattern layer 125 escapes through an exit surface that is the top surface 120a of the LGP 120. The exit surface refers to either of the opposite main surfaces 120a and 120b closer to the flat panel display such as a liquid crystal panel. The light escaping through the exit surface becomes effective light that can be directly injected onto an image display unit. A reflective member 131 may be disposed beneath the bottom surface 120b of the LGP 120. Light incident on the reflective member 131 is reflected by the reflective member 131 into the LGP 120 regardless, in order to satisfy conditions for total reflection.

The surface pattern layer 125 is formed by a combination of different patterns. That is, the surface pattern layer 125 is formed by overlaying a random dot pattern 123 on a holographic pattern 121 repeated with a predetermined grating period P. More specifically, the holographic pattern 121 may be formed by repeating concave-convex wave or sine wave diffraction gratings with the predetermined grating period P. The grating period P can be determined by the wavelength and angle of light being incident on the holographic pattern 121 (See the above Equation (1)). The refractive index of the LGP 120 is about 1.5 and the critical angle for total reflection is about 41.8°. For example, when green light having a 540 nm wavelength is incident on the holographic pattern 121 at an angle of 60°, the grating period P with which green light can be diffracted perpendicular to the exit surface is about 440 nm. An incident angle may vary depending on the refractive index of the LGP 120 or incident wavelength of a light source. The wavelength of the incident light may vary depending on the type of the light source. The grating period P of the holographic pattern 121 may be suitably designed considering the size of the LGP 120 and the wavelength of the light source and determined in the range of 300 to 500 nm.

The holographic pattern 121 changes the propagation path of light so that the light escapes from the LGP 120 approximately perpendicular to the planar surface of the LGP 120, thereby causing the light emitted by the linear light source to be converted into surface light. Some of the light incident on the surface pattern layer 125 under conditions for total reflection is totally internally reflected back into the LGP 120 and propagates inside the LGP 120.

Because the light incident on the holographic pattern 121 is diffracted at different angles depending on the wavelength of the incident light, white light of multiple wavelengths are separated into its component colors at different exit angles according to wavelength as it passes through the holographic pattern 125. In the present exemplary embodiment, the dot pattern 123 is laid on the holographic pattern 121 in order to prevent imbalance in color perception and degradation of image quality.

The dot pattern 123 contains a plurality of nanoparticles that are dispersed over the holographic pattern 121. The particles constituting the dot pattern 123 are arranged at irregular intervals d that are shorter than the grating period P of the holographic pattern 121. Since single-color light beams R, G, and B obtained after color separation by the holographic pattern 121 at different angles are scattered and diffused over a large angular range by the dot pattern 123 overlying the holographic pattern 121, they have wide exit angle ranges $\theta_R$, $\theta_G$, and $\theta_B$. For example, red light with a wavelength of 610 nm may have an exit angle range $\theta_R$ around an exit angle determined by the holographic pattern 121 while 540 nm green light and 470 nm blue light are diffused over angular ranges $\theta_G$ and $\theta_B$ and escape from the LGP 120. In this way, single-color light beams of the same wavelength have a wide exit angle range when being diffused by the dot pattern 123, thus allowing the individual color light beams R, G, and B to be uniformly dispersed over the entire display surface of the LGP 120 and have wide exit angle ranges $\theta_R$, $\theta_G$, and $\theta_B$. This prevents imbalance in color perception due to different observation angles and resulting degradation of image quality.

The degree of scattering of light by the dot pattern 123 is affected by the diameter of the particles constituting the dot pattern 123 and the density of the particles distributed per unit area. That is, as the diameter of particles decreases and the density thereof increases, diffusion and mixing of light due to scattering is accelerated. The particles in the dot pattern 123 may have a diameter of several nanometers (nms) to less than an order of incident wavelength, e.g., about 30 nm to about 300 nm.

Figure 6:
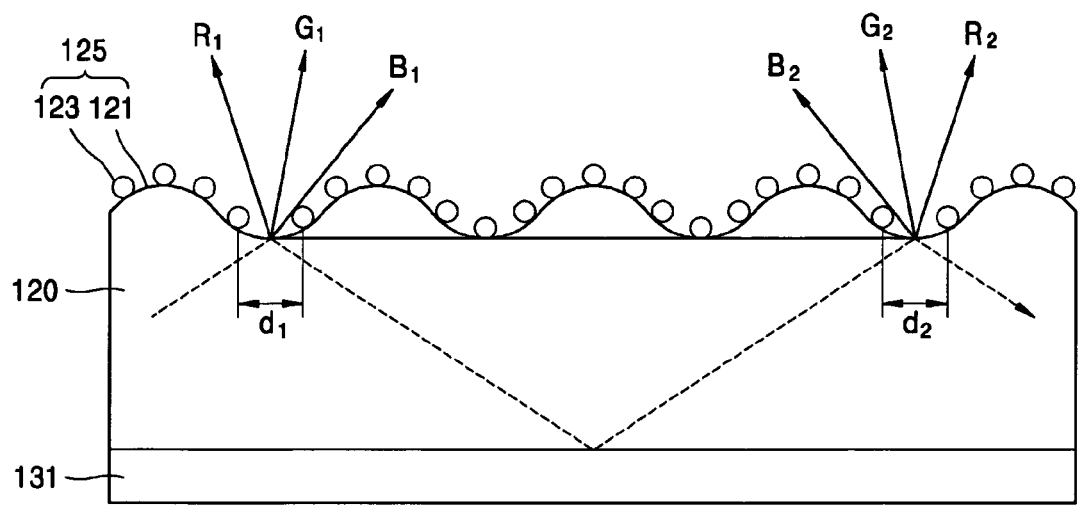

The angle of diffraction by the holographic pattern 121 is mostly affected by the dot pattern 123, more specifically, the interval d between dots through which light passes. As shown in FIG. 6, the dot pattern 123 is an irregular, random pattern of dots with different intervals d1 and d2. Because the intervals d1 and d2 between dots vary depending on an incident position, the final diffraction angle of even single-color light having the same wavelength varies depending on its incident position. For example, referring to FIG. 6, because interval d1 between dots at one position is different from interval d2 between dots at another position, light is diffracted at different angles depending on its incident position. Each single-color beam R1, G1, or B1 obtained after separation at the one position is diffracted at a different angle than individual color beams R2, G2, or B2 that have the same wavelength as R1, G1, or B1 but are obtained after separation at the other position.

As in the prior art, the holographic pattern 121 formed with a predetermined period separates white light of multiple wavelengths into its component colors at exit angles determined according to wavelength. This causes the intensity of each single-color light to vary according to an observation angle, thus resulting in degradation of image quality. That is, color reproduced through a flat-panel display panel is made uneven over an observation angle range. For example, red may be sensed strongly in one direction while blue may be sensed strongly in another direction. The surface pattern layer 125 according to the exemplary embodiment of the present invention includes the holographic pattern 121 and the dot pattern 123 having an uneven interval. Thus, since a light beam diffracted by the holographic pattern 121 and the dot pattern 123 in combination escapes at different angles even when it has the same wavelength, the intensity of each color light is made substantially uniform across observation angles.

As shown in FIG. 4, a transmissive diffusion sheet 111 may be disposed above the LGP 120. While not being an essential component, the transmissive diffusion sheet 111 transmits and diffuses light exiting the LGP 120 in order to disperse light intensity across the entire display surface of the LGP 120, thereby contributing to image quality. The surface pattern layer 125 may be formed at either or both the top and bottom surfaces 120a and 120b.

Figure 7:
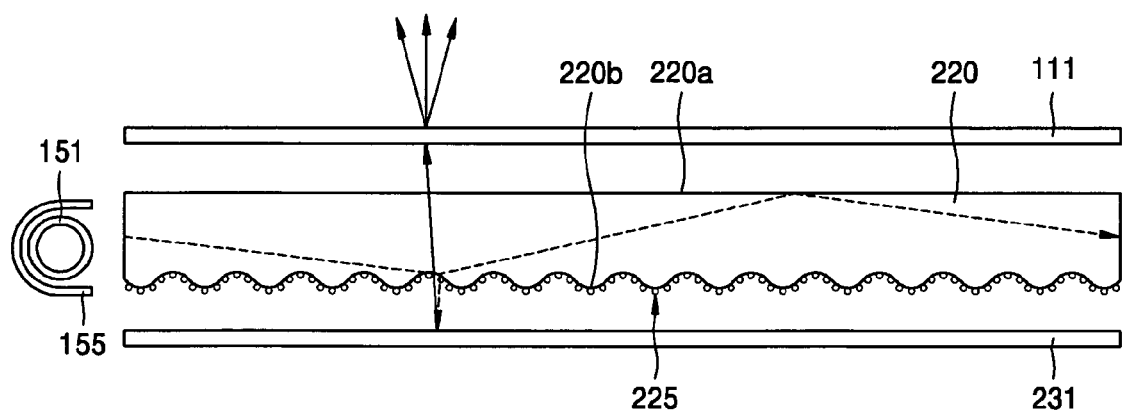
FIG. 7 shows a modified example of the backlight unit of FIG. 4.

As shown in FIG. 7, when a surface pattern layer 225 is formed at a bottom surface 220b of an LGP 220, a refractive member 231 is disposed below the LGP 220 and reflects upward light diffracted by the surface pattern layer 225. The light diffracted by the surface pattern layer 225 is reflected by the reflective member 231 back to the surface pattern layer 225. Some of light is then incident back into the LGP 220 while the remaining light escapes through an exit surface that is a top surface 220a of the LGP 220.

Figure 8:
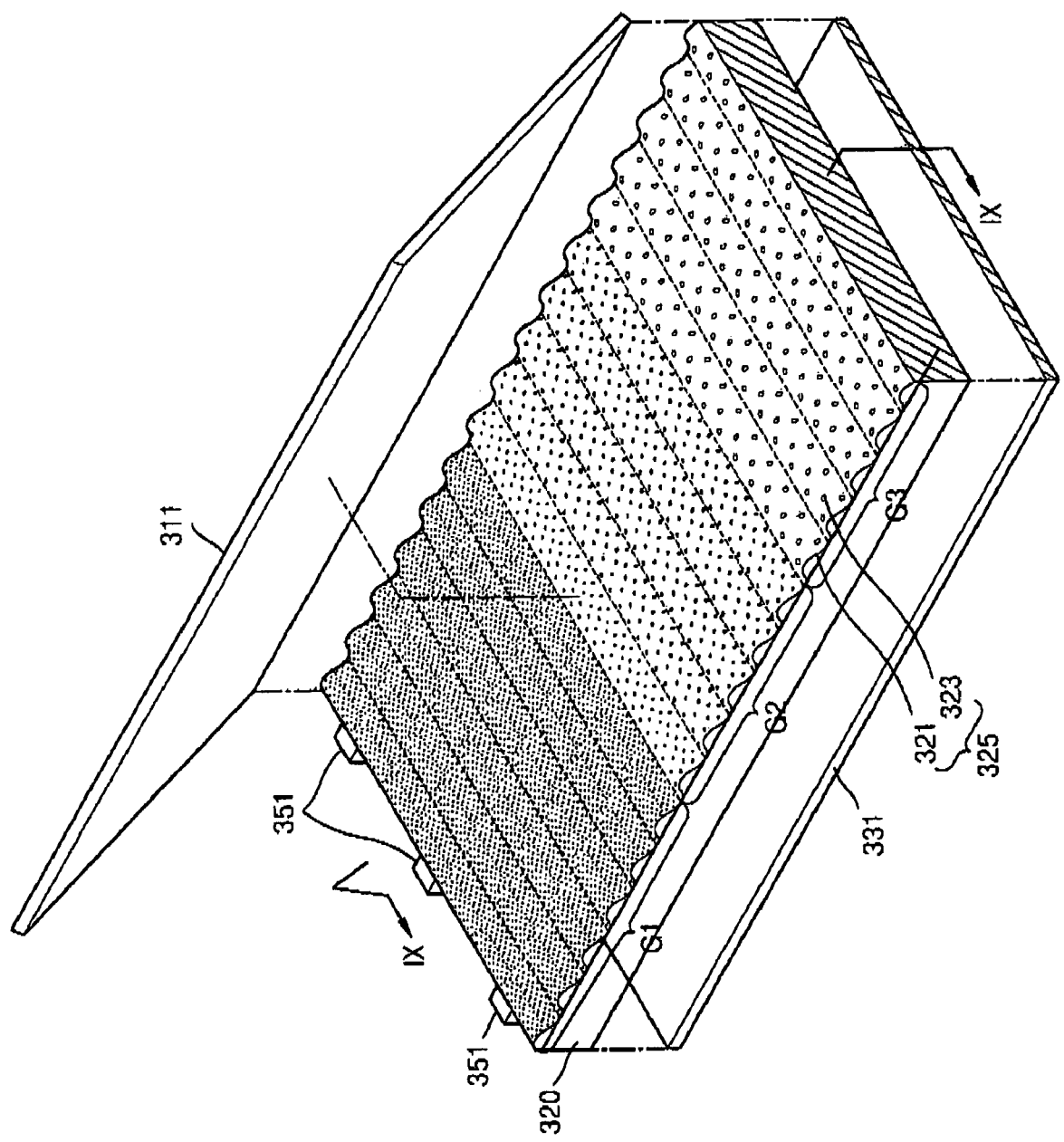
FIG. 8 is an exploded perspective view of a backlight unit for a flat panel display according to a second exemplary embodiment of the present invention.

FIG. 8 is an exploded perspective view of a backlight unit for a flat panel display according to a first exemplary embodiment of the present invention. An edge light type backlight unit including point light sources is used as the backlight unit. Referring to FIG. 8, three spaced-apart light sources 351 are disposed along a side edge of an LGP 320. The point light sources may be, for example, a light-emitting diode (LED) or a laser diode (LD). A light beam emitted by the point light source escapes into the LGP 320 over a radially wide angular range. A surface pattern layer 325 is formed at a top surface of the LGP 320 and diffracts upward light propagating along the LGP 320. The surface pattern layer 325 includes a holographic pattern 321 repeated with a predetermined grating period and a dot pattern 323 that is formed on the holographic pattern 321 and contains a number of dots that varies stepwise according to its distance from the light sources 351. Also, a reflective member 331 and a transmissive diffusion sheet 311 may be provided as shown. Light emitted by the light sources 351 is totally reflected within the LGP 320 and diffracted upward by the surface pattern layer 325.

Figure 1:
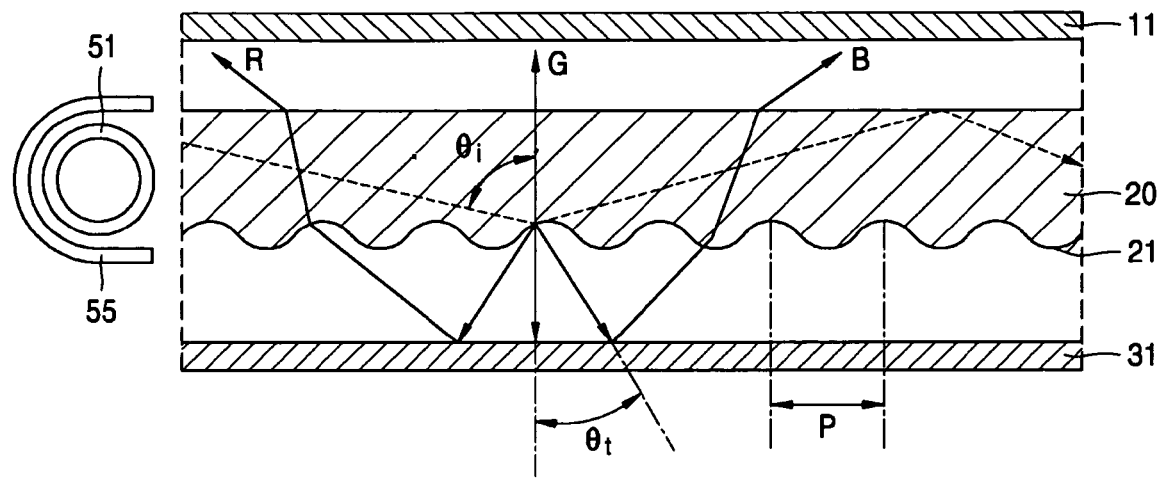
FIG. 1 is a schematic cross-sectional view of a backlight unit disclosed in the Korean Laid-open Patent Publication No. 2003-4021.
Figure 2:
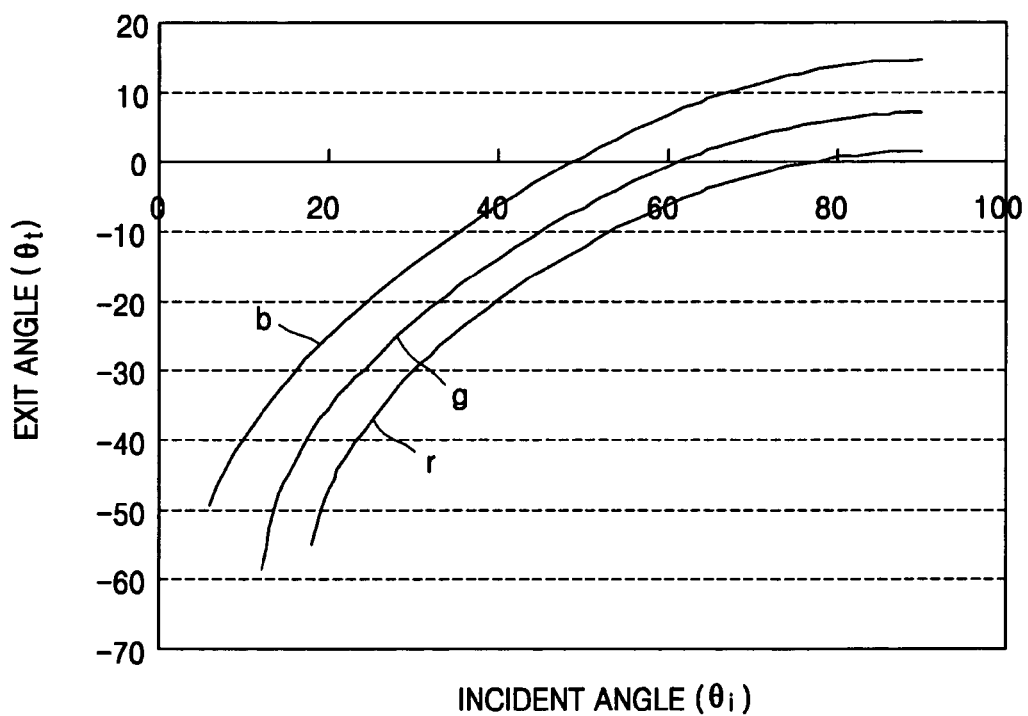
FIG. 2 shows distribution of exit angles with respect to incident angles for individual color light on a holographic pattern.
Figure 9:
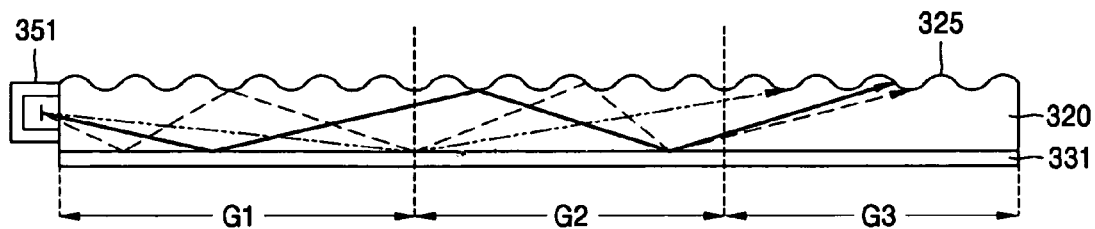
FIG. 9 is a cross-sectional view taken along line IX-IX of the backlight unit of FIG. 8.

FIG. 9 is a cross-sectional view taken along line IX-IX of the backlight unit of FIG. 8. The dot pattern 323 is not shown in FIG. 9. Referring to FIG. 9, when the LGP 320 is divided into first through third regions G1 through G3 according to its distance from the light sources 351 disposed along the side edge thereof, light incident into the second and third regions G2 and G3 is injected onto the surface pattern layer 325 at various incident angles after being totally reflected several times while light incident into the first region G1 closest to the light sources 351 is injected onto the surface pattern layer 325 at approximately the same angle. As evident from FIG. 2, when incident angles are distributed over a wide range, exit angles are distributed over a wide range accordingly, which means light is widely scattered over the entire surface of the LGP 320 and color light of different wavelengths is mixed with one another, thus achieving uniformity of brightness and balance in color perception. Conversely, when incident angles are restricted to a narrow range, an exit angle of a light beam is also limited to a narrow range, thus resulting in non-uniform brightness and color imbalance because the intensity of individual color light of different wavelengths varies depending on an observation angle.

To prevent these problems, the backlight unit according to the present exemplary embodiment includes the dot pattern 323 containing a number of dots that varies depending on the distance from the light sources 351. That is, the dot pattern 323 corresponding to the first region G1 closest to the light source 351 contains smallest particles arranged most densely such that escaping light is scattered over a wide range and various color light beams are mixed with one another. Conversely, the dot pattern 323 corresponding to the third region G3 farthest away from the light sources 351 contains the largest particles arranged most sparsely. This achieves overall balance in colors and brightness of an image.

The diameter and density of particles making up the dot pattern 323 may vary stepwise for each region in the LGP 320 partitioned according to the distance from the light source 351 or continuously according to the distance from the light source 351. This is achieved by changing the density of nanoparticles in arranging the nanoparticles on a master substrate as a mold for the LGP 320, which will be described in detail later. For example, when Self-Assembled Monolayer (SAM) is applied, the density of surface particles can be adjusted according to the density of charges of opposite polarities on the surfaces of a master substrate and a particle, which will be described in more detail later.

A linear light source having a line-shaped light-emitting portion along an incident surface of the LGP 320 may be used as the light source instead of the plurality of point light sources 351 arranged along the incident surface thereof.

Figure 10:
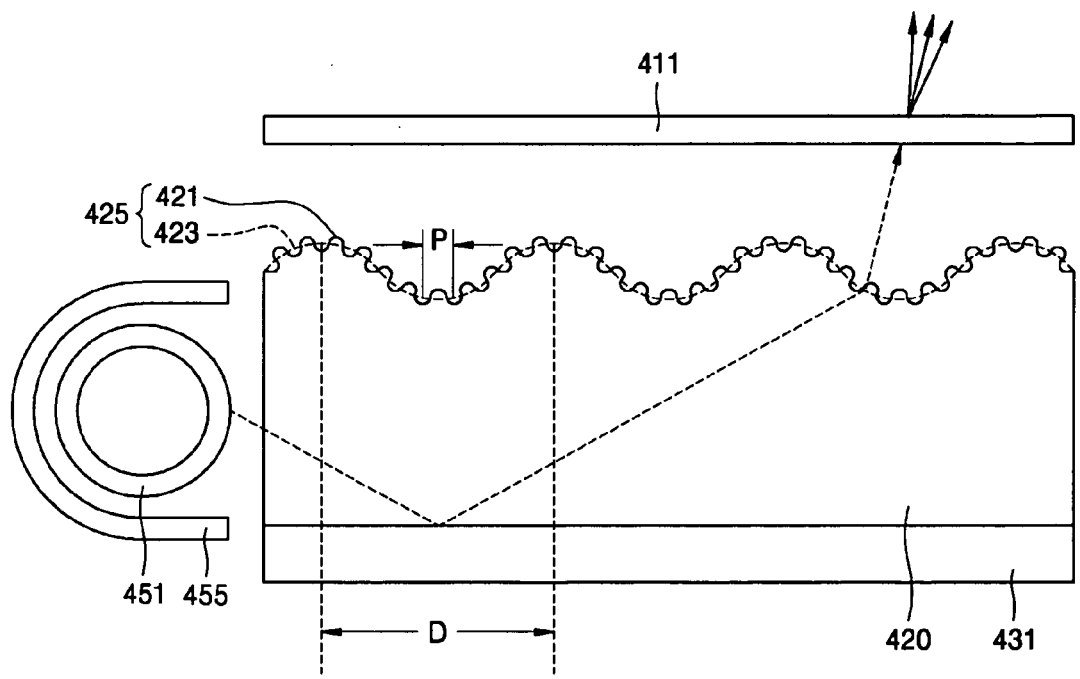
FIG. 10 is a cross-sectional view of a backlight unit for a flat panel display according to a third exemplary embodiment of the present invention.

FIG. 10 is a cross-sectional view of a backlight unit for a flat panel display according to a third exemplary embodiment of the present invention. An LGP 420 has a surface pattern layer 425 at either or both the top and bottom surfaces. The surface pattern layer 425 includes a holographic pattern 421 repeated with a predetermined grating period P. The holographic patterns 421 are arranged in such a way as to create a sine wave with a cycle of rise and fall repeated at intervals D longer than the grating period P. That is, the holographic pattern 421 is arranged along the sine wave 423 consisting of a repeating pattern of rise and fall in the direction away from a light source 451. The surface pattern layer 425 can be understood as a combination of different patterns, i.e., an overlay of the sine wave 423 with rise and fall repeated at the intervals D longer than the wavelength of incident light and the holographic pattern 421 repeated with the shorter period P. The light source 451 may be installed within a light source housing 455. The device may also include a reflective member 431.

Figure 11:
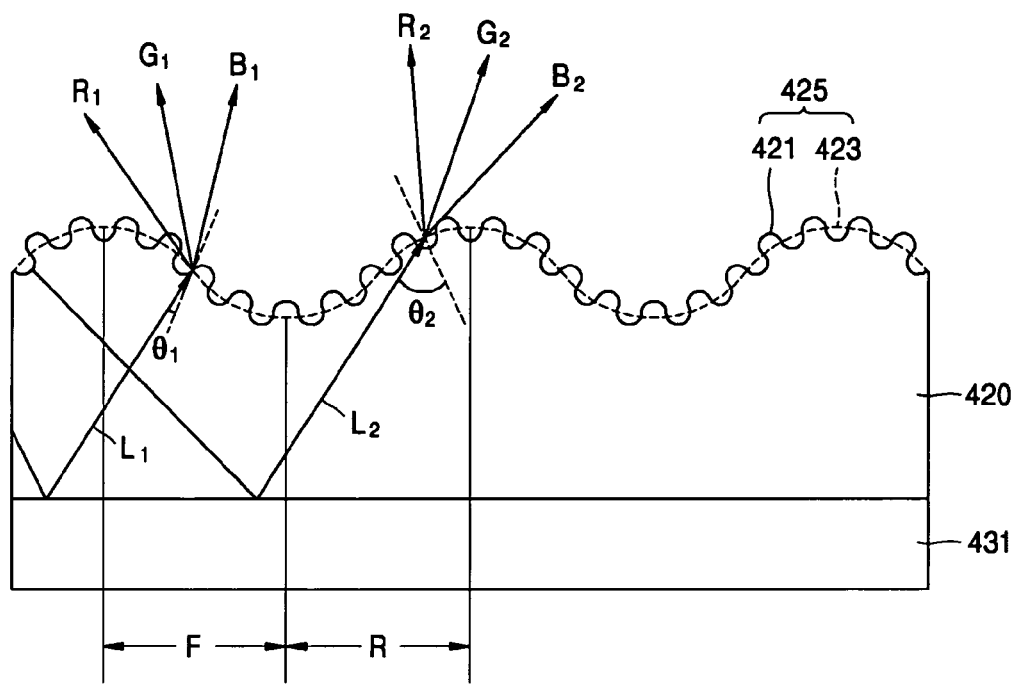
FIG. 11 illustrates a distribution of light diffracted by the surface pattern layer shown in FIG. 10.

By arranging the holographic pattern 421 along the wave 423, the incident angle of light entering the surface pattern layer 425 can be distributed over a wide range. That is, when the light is incident on the sine wave 423, the incident angle of the light varies depending on its incident position. For example, as shown in FIG. 11, light beams $L_1$ and $L_2$ incident on intervals F and R falling and rising in the direction away from the light source 451 have different incident angles $\theta_1$ and $\theta_2$. When the LGP includes a holographic pattern linearly arranged in one direction as in the prior art, the light beams $L_1$ and $L_2$ may have the same incident angle. As evident from FIG. 2, light beams having the same wavelength have different exit angles when their incident angles are different. That is, when an incident angle is distributed over a wide spectral range, exit angles are distributed over a wide range, accordingly. Thus, the exemplary embodiment of the present invention solves imbalance in color perception suffered by a conventional LGP when a specific color is predominantly sensed according to an observation angle by allowing a light beam having a specific wavelength to escape from the LGP at a predetermined exit angle and the resulting degradation of image quality. The sine wave 423 formed by the holographic pattern 421 may have a regularly fixed period or an irregularly varying interval corresponding to the period (e.g., the distance between successive high limits having the same level). The latter is advantageous for distributing an incident angle of a light beam over a wider range. The light incident on the surface pattern layer 425 is diffracted by the holographic pattern and escapes from the LGP 420 at a large exit angle approximately perpendicular to the surface of the LGP 420. A transmissive diffusion plate (411 of FIG. 10) may be disposed above the LGP 420 and disperses the escaping light over a wide area, thereby achieving a uniform brightness distribution across the entire screen.

Although not shown in FIG. 10, the interval D of the sine wave 423 may vary continuously or stepwise depending on the distance from the light source 451. That is, the interval D for the sine wave 423 can be made shorter at a region of the LGP 420 closer to the light source 451 while the interval D for the sine wave 423 can be made longer at a region of the LGP 420 farther away from the light source 451. Light is injected onto the surface pattern layer 425 at various incident angles after being totally reflected several times in the region of the LGP 420 farther away from the light source 451. On the other hand, light is injected onto the surface pattern layer 425 at approximately the same angle in the region of the LGP 420 closer to the light source 451. Thus, in order to provide uniform distribution of color or brightness across the entire surface of the LGP 420, the interval D for the wave 423 may be made shorter at the region closer to the light source 451 in which exit light is required to be dispersed over a wide area and be made longer at the region farther away from the light source 451.

The backlight unit for a flat panel display according to the present exemplary embodiment can also be modified as shown in FIG. 7. That is, the surface pattern layer 425 may be formed on the bottom surface of the LGP 420 and a reflective member may be disposed below the LGP 420 in order to induce light diffracted by the surface pattern layer 425 to a display direction.

Figure 12:
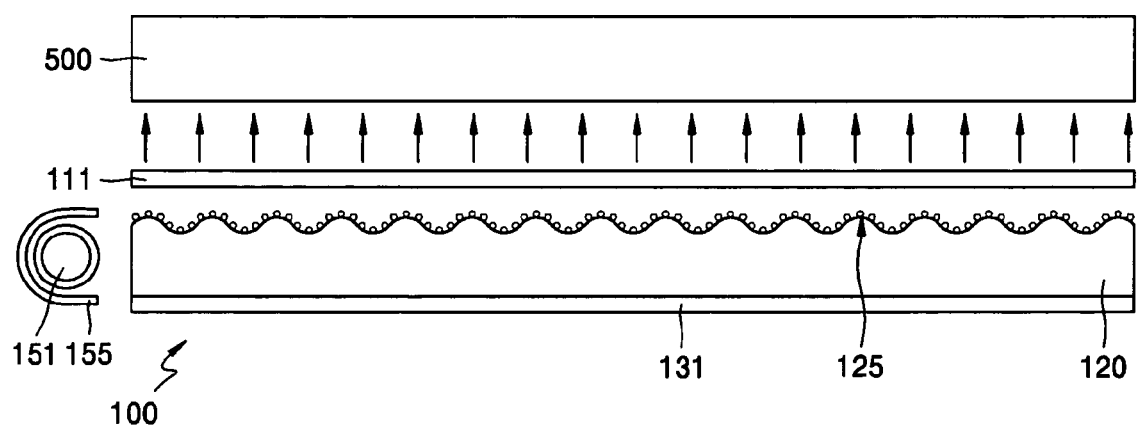
FIG. 12 schematically shows a flat panel display apparatus according to an exemplary embodiment of the present invention.

FIG. 12 is a cross-sectional view of a flat panel display apparatus according to an exemplary embodiment of the present invention. An LCD apparatus is used as the flat panel display apparatus. The flat panel display apparatus includes the backlight unit 100 and the flat panel display 500 located in front of the backlight unit 100. The backlight unit 100 and the flat panel display 500 are attached to face each other in a direction in which light escapes. The backlight unit 100 may be configured as shown in FIG. 3. When one linearly polarized beam is incident on a liquid crystal layer in a liquid crystal panel as the flat panel display 500, the polarization of the light passing through the liquid crystal layer is changed by changing the direction of a liquid crystal director with an electric field being applied, thereby enabling image information to be displayed on the liquid crystal panel. The liquid crystal panel is coupled to a driving circuitry. Since the detailed configuration of the liquid crystal panel and display operation using the driving circuitry are widely known in the art, their description will not be given.

Because a backlight unit for a flat panel display according to the exemplary embodiment of the present invention irradiates uniform light over the entire screen of the flat panel display, a flat panel display apparatus employing the backlight unit can be implemented as a high quality display providing uniform distributions of colors and brightness across the entire display surface. The present invention also provides a slim flat panel display apparatus by employing a backlight unit having a simple structure that can emit surface light.

A method of fabricating the LGP 120 shown in FIG. 3 will now be described. First, a photosensitive material for recording optical information such as photo-resist is formed on a master substrate and optical interference between two incident beams diverging from the same light source is induced using an interference optical system to form a holographic pattern on the photo-resist. The interference optical system is configured such that the holographic pattern has a grating period predetermined considering an incident angle and an exit angle.

Figure 13A:
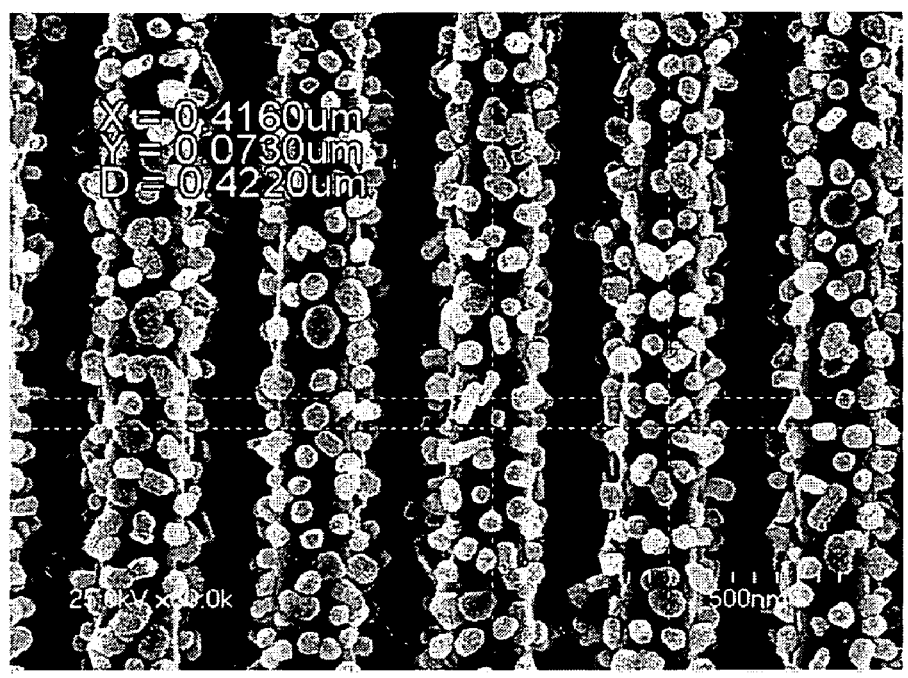
FIGS. 13A and 13B show photographs of a master substrate used as a mold for fabricating a light guide panel (LGP) having a surface pattern layer.
Figure 13B:
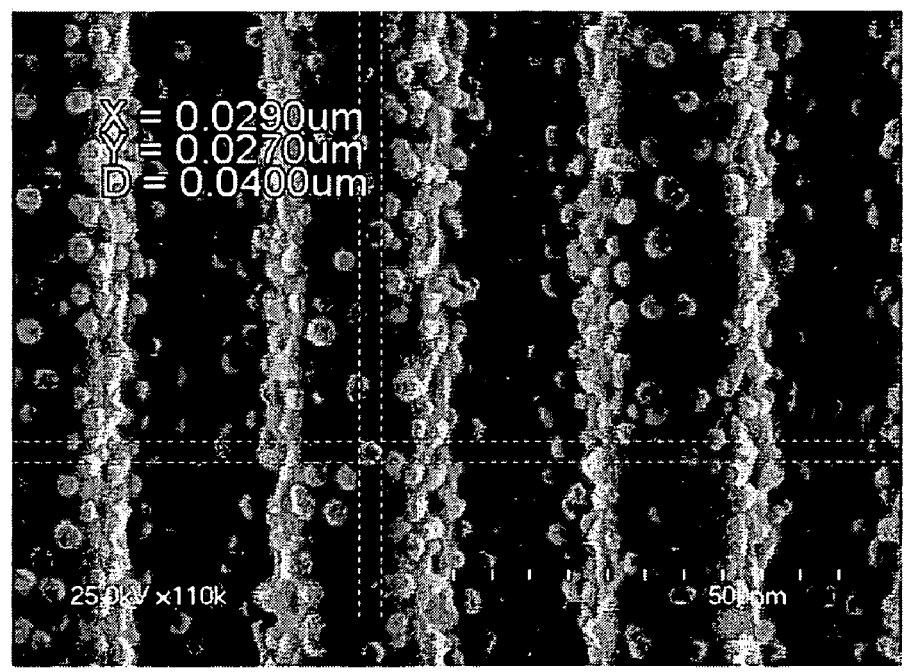

Using the photo-resist with the holographic pattern recorded thereon as an etch stop layer, an etching or developing process is performed to obtain the master substrate having a holographic pattern formed thereon. Then, a dot pattern is formed on the master substrate by dispersing nanoparticles over the master substrate using a well-known SAM method whereby a master substrate whose surface has been electrically charged in polarity is placed in an atmosphere surrounding nanoparticles whose surfaces are charged with polarity opposite to that of the surface of the master substrate. Then, the nanoparticles are selectively assembled to one another by electrochemical characteristics to form a monolayer. In this case, the density of nanoparticles constituting the dot pattern can be adjusted by adjusting displacement of microelectrodes disposed on the master substrate. Further, the diameter of the nanoparticles can be adjusted by restricting it to less than a predetermined diameter. The nanoparticles may be metal powder such as copper (Cu) or silver (Ag) or polymer powder such as polyethylene or polyurethane. The metal powder or polymer powder may have a restricted diameter. FIGS. 13A and 13B show photographs of a master substrate having nanoparticles arranged on a holographic pattern. X, Y, and D denote diameters of nanoparticles, i.e., the lengths of rectangular meshes with the nanoparticles. X and Y are lengths of meshes measured in two directions perpendicular to each other and D is the diagonal length of a mesh. Nanoparticles shown in FIGS. 13A and 13B have different densities and diameters of about 40 to about 70 nm and about 20 to about 40 nm, respectively. The nanoparticles constituting a dot pattern shown in FIG. 13A are more densely arranged than those shown in FIG. 13B.

After obtaining the master substrate as a mold, the holographic pattern and the dot pattern formed on the master substrate are transferred to an LGP using injection molding, thereby allowing high volume production of LGPs having a surface pattern layer formed thereon.

A backlight unit for a flat panel display and a flat panel display apparatus having the same according to the present invention can provide surface light exiting perpendicularly to the surface of the backlight unit using a simple structure, i.e., a holographic pattern formed in the LGP while alleviating or eliminating color separation due to the holographic pattern by forming a different pattern on the holographic pattern. In particular, the present invention makes it possible to obtain surface light with uniform distributions of color and intensity across the entire area of the LGP by adjusting the density or diameter of particles in the dot pattern overlapping the holographic pattern according to the distance from a light source.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight unit for a flat panel display displaying a predetermined image, the backlight unit comprising:
   a light source emitting light;
   a light guide panel having an incident surface facing the light source and totally reflecting incident light through the incident surface toward the flat panel display;
   a holographic pattern that is formed at at least one of an exit surface of the light guide panel and a surface opposing the exit surface, the holographic pattern having a predetermined grating period and diffracting incident light into the light guide panel; and
   a dot pattern containing a plurality of particles dispersed on the holographic pattern at intervals shorter than the grating period and scattering incident light.

2. The backlight unit of claim 1, wherein the particles are arranged at irregular intervals.

3. The backlight unit of claim 1, wherein the holographic pattern is formed by continuously repeating sine wave or concave-convex wave gratings with the grating period.

4. The backlight unit of claim 1, wherein the grating period of the holographic pattern is 300 to 500 nm.

5. The backlight unit of claim 1, wherein the diameter of the particles constituting the dot pattern is 30 to 300 nm.

6. The backlight unit of claim 1, wherein the diameter of the particles constituting the dot pattern progressively decreases toward the light source.

7. The backlight unit of claim 6, wherein the diameter of the particles varies continuously or stepwise depending on the distance from the light source.

8. The backlight unit of claim 1, wherein the density of the particles in the dot pattern distributed per unit area increases toward the light source.

9. The backlight unit of claim 8, wherein the density of the particles varies continuously or stepwise depending on the distance from the light source.

10. The backlight unit of claim 1, further comprising a transmissive diffusion plate that is located in front of the exit surface of the light guide panel and transmits and diffuses light escaping from the light guide panel.

11. The backlight unit of claim 1, further comprising a reflective member disposed at a surface opposite to the exit surface of the light guide panel and reflecting light escaping from the light guide panel toward a display direction.

12. The backlight unit of claim 1, wherein the light source includes a plurality of point light sources arranged along the incident surface of the light guide panel.

13. The backlight unit of claim 1, wherein the light source is a linear light source having a line-shaped light-emitting portion disposed along the incident surface of the light guide panel.

14. A flat panel display apparatus for displaying a predetermined image, the flat panel display apparatus comprising:
a flat panel display; and
a backlight unit irradiating light on the flat panel display, wherein the backlight unit comprises:
a light source emitting light;
a light guide panel having an incident surface facing the light source and totally reflecting incident light through the incident surface toward the flat panel display;
a holographic pattern that is formed at at least one of an exit surface of the light guide panel and a surface opposing the exit surface, the holographic pattern having a predetermined grating period and diffracting incident light into the light guide panel; and
a dot pattern containing a plurality of particles dispersed on the holographic pattern at intervals shorter than the grating period and scattering incident light.

15. The apparatus of claim 14, wherein the particles are arranged at irregular intervals.

16. The apparatus of claim 14, wherein the diameter of the particles constituting the dot pattern is 30 to 300 nm.

17. The apparatus of claim 14, wherein the diameter of the particles constituting the dot pattern progressively decreases toward the light source.

18. The apparatus of claim 14, wherein the density of the particles in the dot pattern distributed per unit area increases toward the light source.

* * * * *